M. MILLER.
WATER MOTOR.
APPLICATION FILED FEB. 18, 1916.

1,203,382.

Patented Oct. 31, 1916.
3 SHEETS—SHEET 1.

Witness

Inventor
M. MILLER.
By
Attorney

M. MILLER.
WATER MOTOR.
APPLICATION FILED FEB. 18, 1916.

1,203,382.

Patented Oct. 31, 1916.
3 SHEETS—SHEET 2.

Witness
W. F. Keith
Robt. Meyer

Inventor
M. Miller
By
Randolph Jr., Attorney

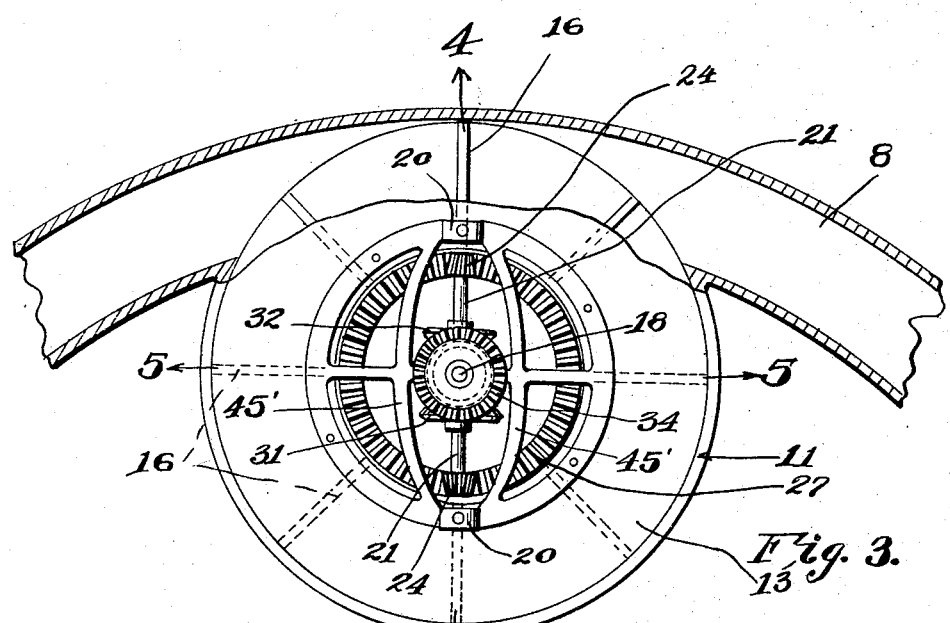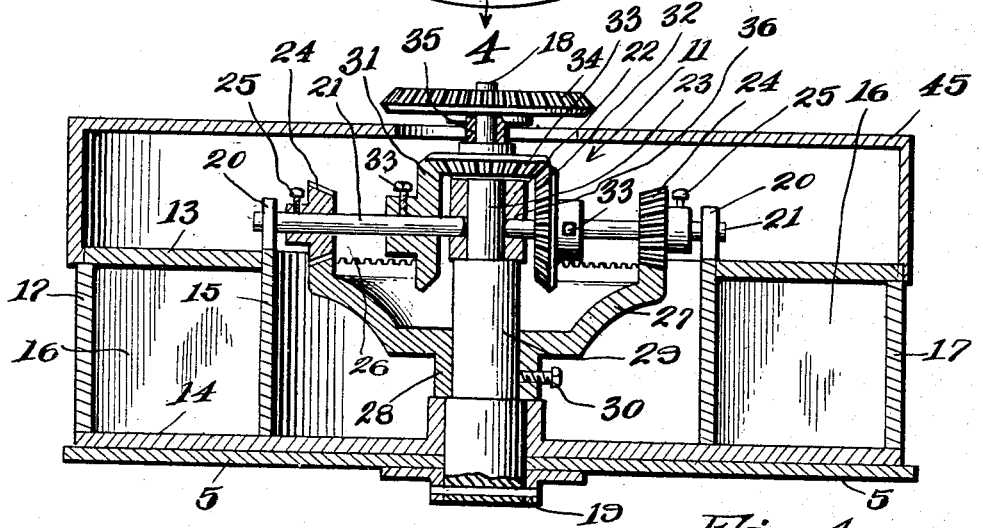

UNITED STATES PATENT OFFICE.

MAGNUS MILLER, OF MANTON, RHODE ISLAND.

WATER-MOTOR.

1,203,382.

Specification of Letters Patent.   Patented Oct. 31, 1916.

Application filed February 18, 1916.   Serial No. 79,152.

*To all whom it may concern:*

Be it known that I, MAGNUS MILLER, a citizen of the United States, residing at Manton, in the county of Providence and State of Rhode Island, have invented certain new and useful Improvements in Water-Motors; and I do hereby declare the following to be a full, clear, and exact description of the invention, such as will enable others skilled in the art to which it appertains to make and use the same.

This invention relates to improvements in water motors, and more particularly to the type of motor wherein a stream of water flowing down an incline is employed for the purpose of driving a plurality of water wheels, which are in turn connected to a central power shaft for driving the power shaft by the downward flow of the water.

Another object of this invention is to provide a novel form of gearing for transmitting the power of the water wheels to the central power shaft.

A further object of this invention is to provide a water motor as specified wherein an upper tank is employed into which a natural or artificial stream of water flows, and to provide a spirally arranged flume or flumes, which wind about the central power shaft and communicate with a top shot wheel which is connected by a novel form of gearing to the central power shaft, and to mount a platform beneath the flume, which rotatably supports the plurality of water wheels, certain of the paddles of which project into the flume whereby the wheels will be rotated by the downward flowing of the water.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1:
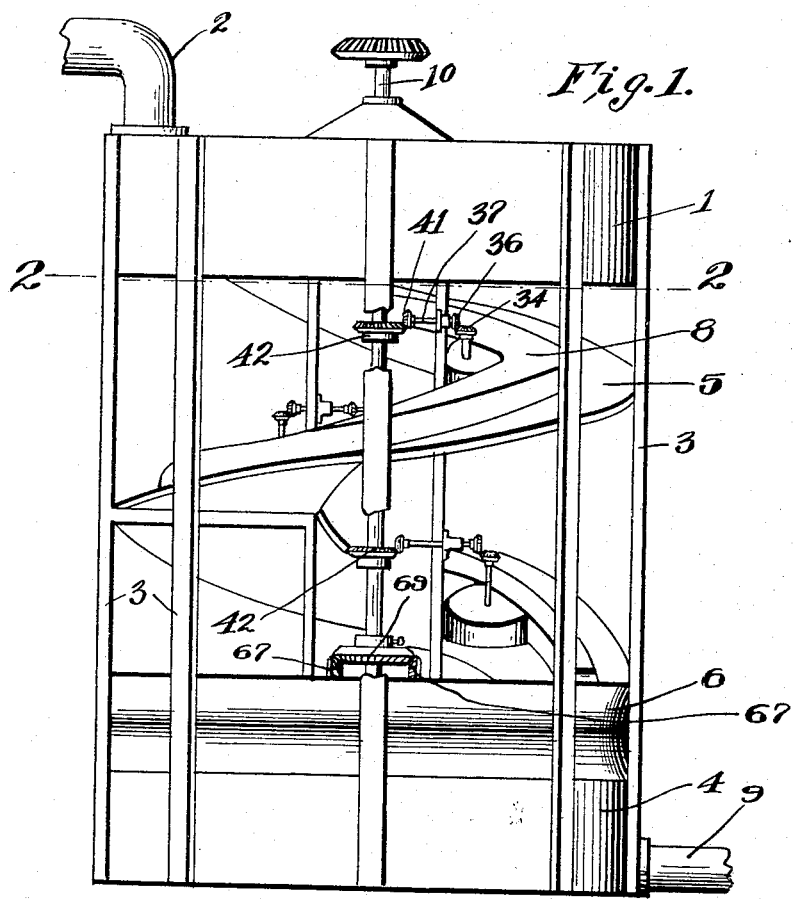
Figure 6:
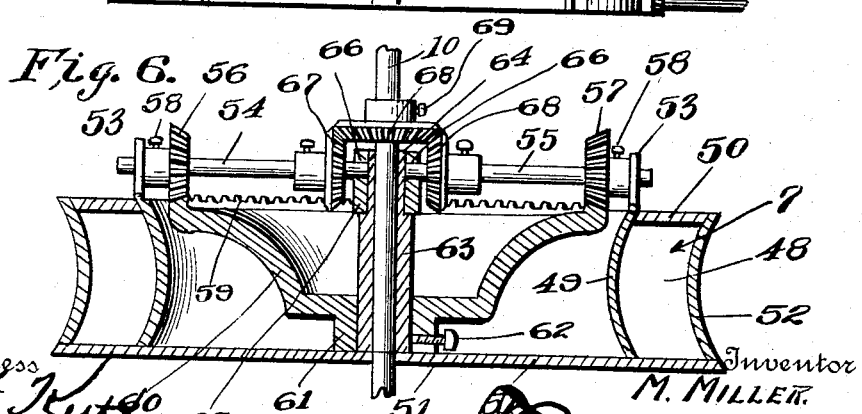
Figure 2:
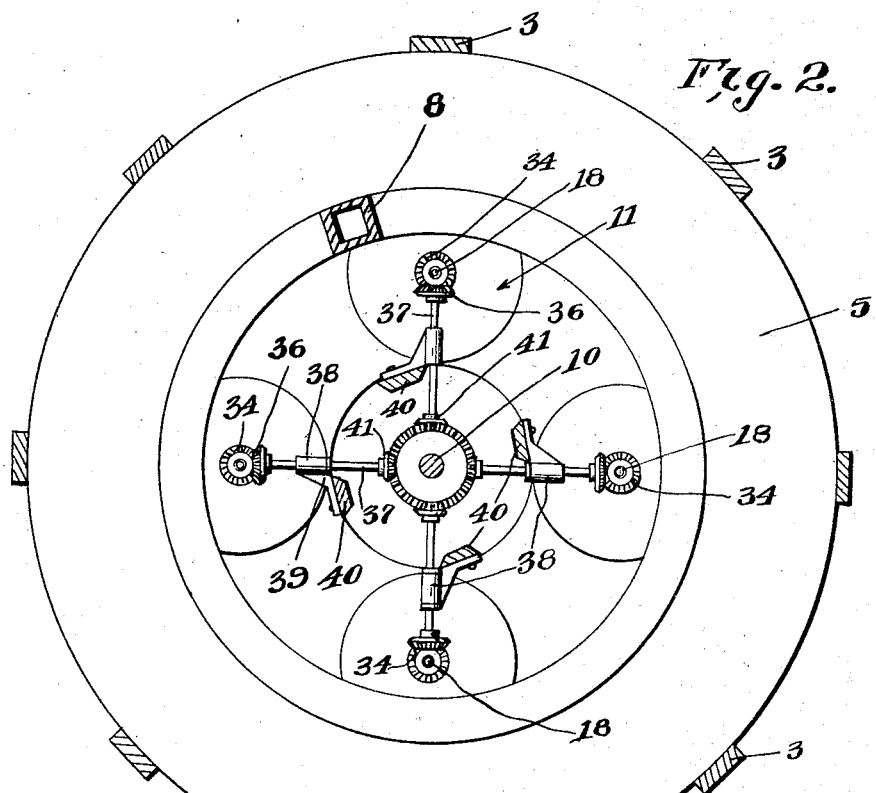
Figure 5:
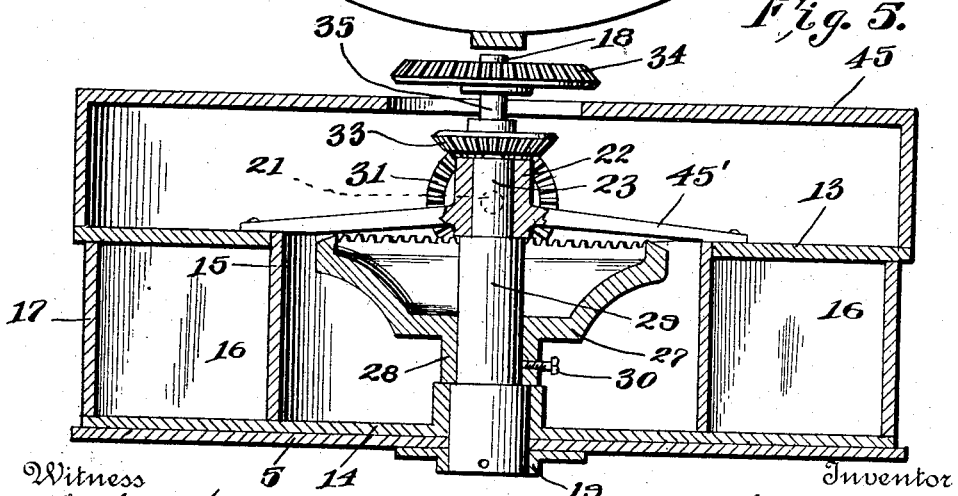

Figure 1 is a side elevation of the improved water motor, Fig. 2 is a horizontal section through the motor on the line 2—2 of Fig. 1, Fig. 3 is a fragmentary plan view of the water motor showing the flume in section and the gearing of one of the water wheels in plan, Fig. 4 is a section on the line 4—4 of Fig. 3, Fig. 5 is a section on the line 5—5 of Fig. 3, and Fig. 6 is a section through the top shot wheel which is mounted at the delivery end of the flume, illustrating the gearing operated thereby, in side elevation.

Referring more particularly to the drawings, 1 designates a top tank of the water motor, which has a lead pipe 2 communicating therewith through which the water may flow from any desired natural or artificial source. The tank 1 has a plurality of vertical braces or standards 3 attached thereto and extending downwardly therefrom, which standards have their lower ends connected to the bottom tank 4 of the water motor. A spiral platform 5 is attached to the under surface of the tank 1, and coiled spirally about the space inclosed by the vertical standards 3, to which it is connected. The lower end of the spiral platform 5 is attached to the casing 6 of the top shot wheel structure 7. A flume 8 is mounted on the platform 5 and has communication with the tank 1 so that the water flowing into the tank 1 will pass out of the tank into the flume 8, downwardly through the flume, and into the casing surrounding the top shot wheel 7, and from thence into the bottom tank 4, out of which it flows through a main or outlet pipe 9. The flume 8 is supported by the platform 5 and curves spirally therewith about the central shaft 10 of the motor.

Upon reference to Fig. 3 of the drawings, it will be seen that the flume 8 is of much less width than the supporting platform 5 so that a space is left upon each side of the flume. A plurality of water wheels designated generally by the numeral 11 are supported by the platform upon the inner sides of the flume. The inner wall of the flume is cut away as is shown in Fig. 3 so as to permit the water wheels to project partially into the flume and in the path of the water, each wheel preferably formed by a circular upper wall 13, a correspondingly shaped lower wall 14, an inner circular shell 15, and a plurality of radial paddles or blades 16 which extend from the shell 15 between the walls 13 and 14 to the peripheries thereof. An arcuate housing 17 surrounds that portion of the periphery of each wheel which does not extend into the flume. This housing is connected at its edge to the flume and at its lower edge to the platform 5.

Each water wheel is provided with a set of gearing best illustrated in Figs. 4 and 5. Each set of gearing comprises a vertical post 18, which is attached to the under surface of the platform 5 as shown at 19 in Fig. 4. The inner shell 15 of the water wheel has a pair of upstanding brackets 20 formed thereupon, in which the ends of shafts 21 are seated. The shafts 21 have their inner ends journaled in a collar 22, which collar is mounted about an enlarged portion 23 of the post 18. Beveled gears 24 are mounted upon the shafts 21 and are held in engagement therewith, for rotating the shafts by the rotation of the beveled gears by set screws 25 which extend through the hub portion of the beveled gears 24. The beveled gears 24 mesh with the teeth 26 formed upon a gear plate 27. The gear plate 27 has a hub portion 28, which is mounted about the enlarged portion 29 of the post 18 and is held stationary thereon by a set screw 30.

Beveled gears 31 and 32 are mounted upon the shaft 21 and connected thereto, for synchronous rotation with the shaft by means of set screws 33. The beveled gears 31 and 32 mesh with a beveled gear 33, which is rotatably mounted upon the upper reduced end of the post 18. The beveled gear 33 is connected to a beveled gear 34 by a sleeve 35, so that beveled gear 34 will be rotated by and synchronously with the rotation of the beveled gear 33. The water striking the paddles or blades 16 of the water wheel structure 11 will rotate the blades 16 and the shell 15, about the post 18 as an axis. The rotation of the shell 15 will cause the shafts 21 to rotate around the post with the rotation of the water wheel which will rotate the shafts 21, through the meshing engagement of the teeth of the beveled gears 24 with the teeth of the stationary gear plate 27. The rotation of the shafts 21 will be imparted to the beveled gears 33 and 34, through the medium of the beveled gears 31 and 32. The ends of the shafts 21 are rotatably seated in suitable bearing openings 36 which are formed in the sleeve or collar 22.

The beveled gears 34, mesh with beveled gears 36 which are mounted upon horizontally positioned shafts 37. The shafts 37 are rotatably supported by suitable bearings 38. The bearings 38 are attached to or formed upon brackets 39, which brackets are in turn attached to and supported by vertical supporting bars 40. The vertical supporting bars 40 extend vertically through the motor and are attached to the inner edges of the platform 5. The shafts 37 have gears 41 mounted upon their ends remote from the ends upon which the beveled gears 36 are mounted. The beveled gears 41 mesh with beveled gears 42 which are mounted upon the central power shaft 10 at spaced intervals throughout the length of the latter.

The gearing for the water motor may be inclosed by a suitable casing indicated by the numeral 45, if it is so desired. The sleeve 22 is rotatably mounted upon the portion 23 of the stud 18 and it has a plurality of arms 45′ connected thereto, which are in turn connected to the upper circular wall 13 of the water wheel structure. The central shaft 10 has a plurality of beveled gears 42 connected thereto, and a plurality of the water wheel structures 11 are supported by the platform 5 at spaced intervals along its length as clearly shown in Fig. 1 of the drawings. The water flows from the delivery end of the flume 8 against the paddles or blades 48 of the water or top shot wheel structure 7. The top shot wheel structure 7 includes a shell 49, to which the blades 48 are attached and top and bottom plates 50 and 51 respectively. A wall 52 extends about the outer surface of the wheel and incloses the same. The inner shell 49 of the wheel which rotates, has upstanding brackets 53 formed thereon, in which the ends of the shafts 54 and 55 are mounted. The shafts 54 and 55 have beveled gears 56 and 57 mounted thereon, and held in place for synchronous rotation with the shafts by set screws 58. The beveled gears 57 mesh with the teeth 59 of a stationary gear plate 60. The gear plate 60 has a hub portion 61, through which a set screw 62 extends for rigidly connecting the gear plate to a sleeve 63 which is mounted about the power shaft 10 and remains stationary during the rotation. The sleeve 63 has its upper end reduced as is shown at 64, and a collar 65 is rotatably mounted about the reduced end 64 of the sleeve. The collar 65 is provided with bearing openings 66, in which the ends of the shafts 54 and 55 are seated. Beveled gears 67 and 68 are mounted upon the shafts 54 and 55, respectively, and they mesh with a beveled gear 68 which is mounted upon the power shaft 10, and may be keyed thereupon or held attached to the shaft for synchronous rotation therewith by a set screw 69. The water flows out of the casing of the top shot water wheel 48 into the tank 4.

In the operation of the improved water motor, the water enters the upper or top tank 1, through the inner pipe 2 and flows out of this tank into the flume 8. The downward spiral twisting of the flume, will cause the water to rush therethrough, downwardly and into the casing 52 which surrounds the top shot water wheel structure 7, striking the blades 48 of the water wheel structure 47 and rotating the same, which will move the shafts 54 and 55 about the power shaft 10, and cause the beveled gears 56 and 57 to rotate through the meshing engagement of their teeth with the teeth of the stationary gear plate 60. The beveled gears 67 and 68 will transmit the power to the shaft 10 through the medium of the beveled gears 68'. The paddles or blades 16 of the water wheel structures 11, projecting into the flume 8 will be positioned in the path of the water flowing through the flume, which will rotate the water wheels 11 and consequently rotate the gears 34 in the manner heretofore described, which will through the medium of the gears 36, 41 and 42, transmit the power generated by the rotation of the water wheels 11, to the main or central power shaft 10.

In the foregoing description and the drawings, a single spiral flume is shown and described, as coiling about the central shaft 10, from the top tank 1 to the bottom tank 4, but it is to be understood, that two or more spirally arranged flumes may extend from the top tank to the bottom tank, and have gearings and water wheels operatively connected thereto, without departing from the spirit of this invention and further that the flumes may be twisted more than a single spiral, as illustrated in Fig. 1, if it is so desired.

From the foregoing description taken in connection with the accompanying drawings the advantages of construction and of the method of operation of the improved water motor will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a water motor, a flume, a vertical power shaft around which said flume winds, water wheels arranged upon the inner side of said flume and driven by the water flowing therethrough, and means driven by the water wheels for rotating said central power shaft.

2. In a water motor structure, a central power shaft, a spiral flume winding around said shaft, water wheels arranged upon the inner side of said flume, a set of gearing actuated by each water wheel, for transmitting the power of rotation of the water wheels to said central shaft.

3. In a water motor structure, an elevated tank, a central power shaft, a spiral flume communicating with the elevated tank and winding downwardly around the central shaft, water wheels extending into said flume, a water inlet communicating with said elevated tank, and means driven by the water wheels for rotating said central power shaft.

4. In a water motor, the combination, of an elevated tank, a water inlet for said tank, a central power shaft, a spiral flume communicating with said elevated tank and winding downwardly around the central power shaft, water wheels extending into said flume, means driven by said water wheels for rotating the central shaft upon rotation of the water wheels, a top shot water wheel positioned at the delivery end of said flume, the water flowing from said flume adapted to strike the blades of said top shot water wheel, and means operable by the rotation of said top shot water wheel for transmitting power to said central power shaft.

5. In a water motor structure, the combination, of a spiral flume, a central power shaft, said flume winding downwardly about said central power shaft, a plurality of water wheels arranged for operation by the water flowing downwardly through the flume, a set of gearing actuated by each of said water wheels and including a pair of shafts supported by and movable with the water wheels, beveled gears mounted upon said shafts, a stationary gear plate, said beveled gears meshing with said stationary gear plate for rotating said shafts upon the rotation of the water wheels, a second set of beveled gears carried by said shafts, a beveled gear meshing with said last named pair of beveled gears and being operatively connected to a second beveled gear, and means operatively connecting said second beveled gear and said central power shaft for rotating the power shaft upon rotation of said second beveled gear.

6. In a water motor structure, the combination, of a spiral flume, a central power shaft, said flume winding downwardly about said central power shaft, a plurality of water wheels arranged for operation by the water flowing downwardly through the flume, a set of gearing actuated by each of said water wheels and including a pair of shafts supported by and movable with the water wheels, beveled gears mounted upon said shafts, a stationary gear plate, said beveled gears meshing with said stationary gear plate for rotating said shafts upon the rotation of the water wheels, a second set of beveled gears carried by said shafts, a beveled gear meshing with said last named pair of beveled gears and being operatively connected to a second beveled gear, and means operatively connecting said second beveled gear and said central power shaft for rotating the power shaft upon rotation of said second beveled gear, and a top shot water wheel positioned at the delivery end of said flume whereby the water issuing from the flume will strike the blades of the top shot water wheel and rotate the same and means for transmitting power from said top shot water wheel to said central power shaft.

In testimony whereof I affix my signature in presence of two witnesses.

MAGNUS MILLER.

Witnesses:
R. GEORGE D. DALTON,
ERNEST P. MEYER.

Copies of this patent may be obtained for five cents each, by addressing the "Commissioner of Patents, Washington, D. C."